3,845,148
PROCESS FOR THE MANUFACTURE OF CARBON TETRACHLORIDE

Wilhelm Riemenschneider, Frankfurt am Main, Germany, assignor to Farbwerke Hoechst Aktiengesellschaft vormals Meister Lucius & Bruning, Frankfurt am Main, Germany
No Drawing. Filed Oct. 6, 1972, Ser. No. 295,715
Claims priority, application Germany, Oct. 9, 1971, P 21 50 400.7
Int. Cl. C07c *17/00, 19/06*
U.S. Cl. 260—658 R                3 Claims

ABSTRACT OF THE DISCLOSURE

A process for the manufacture of carbon tetrachloride by chlorination of hydrocarbons or their chlorine substitution products in the absence of catalysts under elevated pressures at temperatures of between 0 and 400° C. in a prereaction zone and between 400 and 800° C. in a main reaction zone by heating the prereaction zone periodically to a temperature of from 400 to 800° C. whilst throttling the feed stream during the periods of heating and cooling.

---

The present invention relates to the manufacture of carbon tetrachloride.

It is known that carbon tetrachloride can be produced by high-pressure chlorolysis of aliphatic, cyclo-aliphatic or aromatic hydrocarbons or the chlorine substitution products thereof. The reaction with chlorine is at first carried out in a prereactor at a temperature of from 0° C. to 400° C. and subsequently in a main reactor at a temperature of between 400° C. and 800° C., both reactions taking place under the same pressure within the pre -and main reactor. When using a flow tube as reactor the first part of the tube operated at a temperature of up to 400° C. at the most is the prereaction zone. The prereactor or the prereaction zone is generally filled with a liquid consisting in many cases of hexachlorobenzene or a mixture of hexachlorobenzene and hexachloroethane.

It has been proved that in certain cases, after continuous working, the liquid sump of the prereaction zone is enriched with substances which are more or less chlorinated, but are not sufficiently volatile in order to evaporate or to be entrained into the main reaction zone. This may happen for example when mixtures of chlorinated hydrocarbons interspersed with soot and polymers, are to be submitted to chlorolysis. This occurs also when diolefines such as for example chloroprene or mixtures containing diolefines are used. But also when employing benzene such heavy volatile substances are also obtained, though only in a small quantity. If these substances are not completely chlorinated the reactor gets slowly clogged after being run a long time. Letting off the prereactor liquid occasionally, by which the non-volatile substances would also be removed, and the liquid would suddenly be released as a gas, is quite troublesome owing to the high pressure and temperature and the dissolved hydrogen chloride and is technically quite difficult to be carried out without danger.

The present invention provides a process for the manufacture of carbon tetrachloride by reacting chlorine with aliphatic hydrocarbons with at least 2 carbon atoms, cyclo-aliphatic or aromatic hydrocarbons and/or their chlorine substitution products in the absence of catalysts, at pressures of between 50 and 800 atmospheres and temperatures ranging from 0 to 400° C. in the prereaction zone and from 400 to 800° C. in the main reaction zone; which comprises heating the prereaction zone periodically to a temperature ranging from 400 to 800° C. whilst considerably throttling or entirely cutting off the supply of hydrocarbons or chlorinated hydrocarbons during the periods of the heating and cooling.

The process of the invention not only prevents the reactor from clogging but also provides the advantage of converting the accumulated non-volatile impurities into carbon tetrachloride and thus removing them from the high pressure reactor without difficulty.

Nothing is known about the composition of the heavy volatile constituents apart from the total chlorine content which can be determined analytically and which ranges from 20 to 75% by weight. The substances are mostly of black color and even in hexachlorobenzene of 250° C. only partly soluble. It is therefore surprising that these substances can be converted at high reaction velocity into carbon tetrachloride by merely increasing the chlorination temperature.

By periodical heating of the prereaction zone is to be understood that the heating procedure is repeated at certain intervals which must be adapted to the quantity of the non-volatile substances or the degree of clogging. The moment at which such a heating procedure becomes necessary can be ascertained either empirically or by taking samples and analytically determining the heavy volatile substances. In case the sump product contains a portion of heavy volatile parts of more than 50%, the heating procedure must take place immediately. The procedure in accordance with the invention is to be carried out, under normal working conditions, at intervals of from 3 to 30 days.

In this connection it is favorable not to interrupt the chlorine current but to let it flow at the same or a reduced rate. The supply of the hydrocarbons or of the chlorinated hydrocarbons should be stopped or at least be throttled considerably during the heating and cooling period.

The process of the invention is also applicable to procedures in which, apart from the carbon tetrachloride, phosgene, fluorinated compounds and perchloroethylene are manufactured in the same way.

The following examples serve to illustrate the invention.

Example 1

For the reaction there is used a vertically arranged reaction tube of refined steel for a nominal pressure of 600 atmospheres gauge, lined with nickel. The tube has a length of 3,300 millimeters, an outside diameter of 89 millimeters and an inside diameter of 40 millimeters. By heating at different temperatures, the reaction tube is divided into a prereaction zone and a main reaction zone. The lower electric jacket heating surrounding the reaction tube over a length of 1,100 millimeters is heated to a maximum temperature of 250° C. The tempuerature is measured with an internal thermoelement. This zone having a capacity of 1.4 litres constitutes the prereaction zone. The upper electric jacket heating is adjusted such that the internal temperature of the reactor is 600° C., measured with a shiftable thermoelement. This zone which has a capacity of 2.7 litres constitutes the main reaction zone. The space-time yield is calculated on this volume. The reaction components chlorine and the organic compounds are introduced by means of a plunger pump in liquid form at room temperature at the lower end of the reactor. The reaction mixture is removed at the head of the reactor and cooled to about 250° C. in a cooler lined with nickel. At the end of the cooler a relief valve is disposed by means of which there is maintained the desired pressure in the reactor. The gases relieved from pressure are first cooled in a preliminary separator which is designed as an empty vessel of a capacity of about 10 litres without special cooling means and which is not under pressure. In this vessel, substantially all the hexachlorobenzene is separated. The reaction gas is then cooled to about −75° C. in a cooling coil to condense carbon tetrachloride and chlorine. The hydrogen chloride which has not been condensed is measured with a gas meter and analyzed to determine any chlorine which may have been entrained. Into the above described apparatus there are pumped per hour at a prereactor temperature of 150° C. and a main reactor temperature of 600° C. and under a pressure of 280 atmospheres:

792 g. of benzene (=10.1 moles)
15.7 kg. of chlorine (=45% excess).

There are obtained per hour:

9,270 g. of carbon tetrachloride
32 g. of hexachlorobenzene.

Hence, 98.9% of benzene are converted into carbon tetrachloride and 1.1% into hexachlorobenzene. The space-time yield is therefore 3,435 g. of carbon tetrachloride per litre of reaction space per hour.

After continuous operation of the reactor for 10 days a sample is taken from the reactor sump. By means of a sublimation apparatus it is determined analytically that 55% by weight of the sample are no longer vaporizable. The supply of benzene is then turned off, the chlorine quantity is throttled to about 6 kg. per hour and the prereaction zone of the reactor is heated electrically to 600° C. After this temperature has been maintained for 2 hours whilst chlorine is introduced at the same time an analysis sample proves that the proportion of the non-volatile constituents has been reduced to 5% by weight. Subsequently the heating is turned off and the prereactor temperature is allowed to go down to 150° C. The reactor is then again fed with 792 g. per hour of benzene and 15.7 kg./h. of chlorine.

This operation is repeated at an interval of approximately 10 days. After 100 days the reactor is still working without fault. Carbon tetrachloride and chlorine are separated by distillation and the chlorine is recycled into the reactor.

Example 2

There are pumped into the same apparatus at a temperature of 120° C. in the prereaction zone and 600° C. in the main reaction zone and under a pressure of from 240 to 250 atmospheres per hour:

6,800 g. of a mixture heated to 80° C. and consisting of:

7.0 percent of benzene
14.4 percent of CCl$_4$
19.7 percent of tetrachloroethylene
0.5 percent of trichloroethylene
1.0 percent of pentachloroethane
57.4 percent of hexachloroethane and 9,720 g. of chlorine from which 13,670 g. of carbon tetrachloride and 228 g. of hexachlorobenzene are obtained per hour. This corresponds to a conversion of 100% of the aliphatic components of the feedstock and 87% of the benzene into carbon tetrachloride, the space-time yield being 5,060 g. of carbon tetrachloride per litre of reaction space per hour.

After 100 hours of uninterrupted operation a sample is taken and analysed as in Example 1. It contains 48% by weight of non-volatile components. After cutting off the supply of feed stock the prereaction zone is heated to 600° C. whilst the chlorine dosage remains unchanged. After one hour at a temperature of 600° C. the heating is cut down to approximately 120° C. and the organic mixture is again pumped into the reactor. An analysis of the non-volatile components at the end of the heating period proves that the non-volatile components are reduced to 6% by weight. This measure is repeated every 4 to 5 days and allows an operation time without disturbances of over 2000 hours.

Example 3

Into the same apparatus as in Example 1 there are pumped at 50° C. in the prereaction zone and 620° C. in the main reaction zone, under a pressure of 80 atmospheres, per hour:

1.3 kg. of a residue mixture originating from the residue columns of the vinyl chloride production and containing as main components varying quantities of 1,1-dichloroethane, 1,2-dichloroethane, 1,1,2-trichloroethane, dichlorobutane, chloroprene and non-volatile residues. Analytically this product is composed of from 31 to 38% of carbon, 3.8 to 4.3% of hydrogen and 56 to 65% of chlorine.

Simultaneously, there are pumped into the reactor 11.5 kg. of chlorine per hour.

The yield per hour is:

4.5 kg. of carbon tetrachloride and
49 g. of a mixture consisting of hexachlorobenzene and hexachloroethane.

The space-time yield is 1,670 g. of carbon tetrachloride per litre of reaction space per hour. The 49 g. of by-products obtained correspond to 1.1% of the carbon tetrachloride manufactured.

After 7 days of uninterrupted working of the apparatus it is determined, by means of analysis of a sump sample taken from the prereaction zone of the reactor, that a total of 180 g. of non-volatile residue is suspended in the mixture of hexachlorobenzene and hexachloroethane.

Subsequently, the feeding of the residue mixture is stopped whilst the chlorine supply is maintained. At the same time the prereaction zone is heated electrically from the outside to 600° C. A new analysis after 4 hours of operation at this temperature proves that, apart from 15 g., the non-volatile residue disappeared and was converted into carbon tetrachloride.

Subsequently, the test with the above mentioned mixture is continued as described above.

What is claimed is:

1. In a process for the manufacture of carbon tetrachloride by reacting chlorine with an organic compound selected from the group consisting of aliphatic hydrocarbons containing at least 2 carbon atoms, cyclo-aliphatic hydrocarbons, aromatic hydrocarbons, chlorine substitution products thereof or mixtures thereof in the absence of a catalyst under a pressure ranging from 50 to 800 atmospheres and a temperature of between 0 and 400° C. in a prereaction zone and between 400 and 800° C. in a main reaction zone, the improvement which comprises heating the prereaction zone periodically to a temperature of from 400 to 800° C. while considerably reducing or interrupting entirely the feed of organic compound during the periods of heating and cooling.

2. A process as claimed in claim 1, wherein the feeding of chlorine into the prereaction zone is completely or partially maintained during the heating period.

3. A process as claimed in claim 1, wherein there are intervals of from 3 to 30 days between periodic heatings of the prereaction zone.

References Cited

UNITED STATES PATENTS 2,957,033   10/1960   Degeorges et al. _____ 260—664
3,676,508   7/1972    Krekeler et al. _____ 260—664

DANIEL D. HORWITZ, Primary Examiner

U.S. Cl. X.R.

260—662 R, 664